US012651871B2

(12) United States Patent
Mishra et al.

(10) Patent No.: US 12,651,871 B2
(45) Date of Patent: Jun. 9, 2026

(54) THERMAL MITIGATION FOR USB POWER DELIVERY

(71) Applicant: QUALCOMM INCORPORATED, San Diego, CA (US)

(72) Inventors: Lalan Jee Mishra, San Diego, CA (US); Richard Dominic Wietfeldt, San Diego, CA (US); James Lionel Panian, San Marcos, CA (US); Georgios Konstantinos Paparrizos, Foster City, CA (US)

(73) Assignee: Qualcomm Incorporated, San Diego, CA (US)

( * ) Notice: Subject to any disclaimer, the term of this patent is extended or adjusted under 35 U.S.C. 154(b) by 639 days.

(21) Appl. No.: 17/978,923

(22) Filed: Nov. 1, 2022

(65) Prior Publication Data

US 2023/0056239 A1 Feb. 23, 2023

Related U.S. Application Data

(62) Division of application No. 16/798,238, filed on Feb. 21, 2020, now Pat. No. 11,515,676.

(51) Int. Cl.
*H01R 13/66* (2006.01)
*G06F 1/20* (2006.01)
(Continued)

(52) U.S. Cl.
CPC ........... *H01R 13/6683* (2013.01); *G06F 1/20* (2013.01); *G06F 1/206* (2013.01); *G06F 1/266* (2013.01);
(Continued)

(58) Field of Classification Search
CPC .......... H05K 2201/10219; H01B 7/421; H01R 31/06; G06F 1/20; G06F 1/206; G06F 1/266
See application file for complete search history.

(56) References Cited

U.S. PATENT DOCUMENTS 5,508,885 A * 4/1996 Ishimoto ................ H05K 5/026
361/720
5,797,771 A * 8/1998 Garside .............. H01R 13/6275
439/607.46
(Continued)

FOREIGN PATENT DOCUMENTS

CA 2839637 A1 3/2014
CN 105594074 A 5/2016
(Continued)

OTHER PUBLICATIONS

International Preliminary Report on Patentability—PCT/US2021/018741—The International Bureau of WIPO—Geneva, Switzerland—Sep. 1, 2022.
(Continued)

*Primary Examiner* — Christopher R Zerphey
(74) *Attorney, Agent, or Firm* — Smith Tempel Blaha LLC

(57) ABSTRACT

Thermal mitigation features may be included in a Universal Serial Bus (USB) cable assembly or in the USB receptacle portion of a device. In one aspect, one or both ends of a USB cable jacket may have greater thermal conductivity than the portion between them. The portion having the greater thermal conductivity may dissipate excess heat from the cable into the environment. In another aspect, a USB cable connector or the USB receptacle portion of a device may include a thermoelectric heat pump. The thermoelectric heat pump may move excess heat from the cable assembly or receptacle into a portion of the cable assembly or device that dissipates the heat into the environment.

5 Claims, 7 Drawing Sheets

(51) Int. Cl.

| | |
|---|---|
| *G06F 1/26* | (2006.01) |
| *H01B 7/42* | (2006.01) |
| *H01R 13/533* | (2006.01) |
| *H01R 31/06* | (2006.01) |

(52) U.S. Cl.

CPC .......... *H01B 7/421* (2013.01); *H01R 13/533* (2013.01); *H01R 13/6675* (2013.01); *H01R 31/06* (2013.01)

(56) References Cited

U.S. PATENT DOCUMENTS

| | | | |
|---|---|---|---|
| 5,828,007 | A | 10/1998 | Fujishita et al. |
| 6,215,660 | B1 * | 4/2001 | Lin .................... H05K 7/20181 |
| | | | 361/679.48 |
| 6,798,659 | B2 * | 9/2004 | Chen ....................... H01L 23/38 |
| | | | 361/704 |
| 7,963,773 | B2 * | 6/2011 | Palli ................... H01R 13/6205 |
| | | | 439/38 |
| 8,208,250 | B2 | 6/2012 | Mongia |
| 8,354,593 | B2 | 1/2013 | White et al. |
| 8,649,179 | B2 * | 2/2014 | Hershberger .......... H10N 10/17 |
| | | | 62/3.2 |
| 9,325,097 | B2 | 4/2016 | Do |
| 9,750,158 | B2 * | 8/2017 | Strickland ............ H05K 1/0209 |
| 10,488,892 | B1 * | 11/2019 | Lin .................... H05K 7/20145 |
| 10,739,540 | B2 * | 8/2020 | Dupeux ................. G02B 6/428 |
| 10,910,766 | B2 * | 2/2021 | D'Inca ................. G02B 6/4261 |
| 11,016,252 | B2 * | 5/2021 | Curtis ................ G02B 6/44765 |
| 11,036,017 | B2 * | 6/2021 | Tittenhofer .......... G02B 6/4256 |
| 11,169,583 | B2 * | 11/2021 | Karalnik ............... G06F 1/3287 |
| 11,325,548 | B2 * | 5/2022 | Beska ...................... B62D 1/06 |
| 11,409,340 | B2 * | 8/2022 | Shen .................... H05K 7/2039 |
| 11,515,676 | B2 * | 11/2022 | Mishra ................... G06F 1/266 |
| 12,101,871 | B2 * | 9/2024 | He ........................ H05K 3/4664 |
| 2006/0009054 | A1 | 1/2006 | Avignon et al. |
| 2006/0277923 | A1 * | 12/2006 | Lee .......................... G06F 1/203 |
| | | | 62/3.2 |
| 2014/0060882 | A1 | 3/2014 | Ellis et al. |
| 2016/0006190 | A1 | 1/2016 | Katsuura et al. |
| 2018/0233860 | A1 * | 8/2018 | Lin ...................... H01R 13/665 |
| 2019/0006802 | A1 * | 1/2019 | Ju ........................ H05K 7/2039 |
| 2021/0265786 | A1 | 8/2021 | Mishra et al. |

FOREIGN PATENT DOCUMENTS

| | | |
|---|---|---|
| CN | 107249061 A | 10/2017 |
| CN | 206558850 U | 10/2017 |
| CN | 206976761 U | 2/2018 |
| CN | 207691131 U | 8/2018 |
| CN | 207967513 U | 10/2018 |
| CN | 109301511 A | 2/2019 |
| CN | 208707048 U | 4/2019 |
| CN | 208753684 U | 4/2019 |
| CN | 209747813 U | 12/2019 |
| CN | 112438798 A | 3/2021 |
| EP | 3053225 A1 | 8/2016 |

OTHER PUBLICATIONS

International Search Report and Written Opinion—PCT/US2021/018741—ISA/EPO—Jul. 30, 2021.

Taiwan Search Report—TW110105933—TIPO—Jun. 25, 2024.

\* cited by examiner

THERMAL MITIGATION FOR USB POWER DELIVERY

PRIORITY CLAIM AND RELATED APPLICATION STATEMENT

This application claims priority under 35 U.S.C. § 120 to and is a divisional of U.S. Non-Provisional patent application Ser. No. 16/798,238, filed on Feb. 21, 2020, entitled, "THERMAL MITIGATION FOR USB POWER DELIVERY," the entire contents of which are hereby incorporated by reference.

BACKGROUND

Field

The present disclosure relates generally to thermal mitigation in electronic devices and, more particularly, to thermal mitigation in a cable connector system in which power is delivered along with data signals.

Background

Portable computing devices (PCDs) are becoming necessities for people on personal and professional levels. These devices may include cellular telephones, tablet computers, palmtop computers, portable digital assistants (PDAs), portable game consoles, and other portable electronic devices. A PCD is generally powered by a rechargeable battery, although power may also be supplied from an external source through a cable-based connector system.

Universal Serial Bus (USB) is a data interface that is capable of supplying power along with the data signals. It has become common to charge a battery or otherwise supply power to a PCD by connecting a USB cable between the PCD's USB port and a USB port that supplies power. USB ports that serve as power supply receptacles in this manner have become ubiquitous and are found in diverse environments, including hotel rooms, automobiles, aircraft seating, and other locations where people use PCDs. While USB has long had the capability of supplying a limited amount of power along with the data signals, a more recent iteration of USB, known as USB Power Delivery or USB-PD, is capable of supplying greater amounts of power, such as, for example, on the order of 100 watts. Higher power delivery may enable faster battery charging and provide other advantages.

Although there may be sufficient space in some larger PCDs, such as laptops, to accommodate power conversion circuitry that enables high power delivery through higher supply voltages, PCDs without such power conversion circuitry may be limited to moderate voltages and therefore require high current for high power delivery. There may be additional advantages in utilizing a lower source voltage for a PCD for a given power, such as, for example, eliminating conversion losses altogether, thereby necessitating higher current levels. High current in a USB connector system may tend to produce high amounts of thermal energy. To support high current in a USB or other connector system while avoiding detrimental effects of excessive thermal energy upon the PCD and connector system, improved thermal energy mitigation techniques would be desirable.

SUMMARY

This summary identifies features of some exemplary aspects and is not an exclusive or exhaustive description of the disclosed subject matter. Additional features and aspects are described and will become apparent to persons skilled in the art upon reading the following detailed description and viewing the drawings that form a part thereof.

A connector apparatus in accordance with at least one embodiment is disclosed. The connector apparatus may comprise a first connector having a first plurality of electrical contacts, a second connector having a second plurality of electrical contacts, and cable having a first end coupled to the first connector and a second end coupled to the second connector. The cable may comprise a plurality of electrical signal conductors within a cable jacket. The cable jacket may comprise at least a first end portion and a mid-portion. The first end portion may extend between the first connector and the mid-portion. The first end portion may have a thermal conductivity greater than a thermal conductivity of the mid-portion.

Another connector apparatus in accordance with at least one embodiment is disclosed. The connector apparatus may comprise a connector having a plurality of electrical contacts, and a thermoelectric heat pump device coupled to the connector.

Still another connector apparatus in accordance with at least one embodiment is disclosed. The connector apparatus may comprise first means for electrically and mechanically mating a first plurality of electrical contacts to a first mating connector, second means for electrically and mechanically mating a second plurality of electrical contacts to a second mating connector, and means for conveying electrical signals between the first plurality of electrical contacts and the second plurality of electrical contacts through a cable. The means for conveying may have a first end coupled to the first connector and a second end coupled to the second connector. The means for conveying may comprise a first end portion and a mid-portion. The first end portion may extend between the first means and the mid-portion. The first end portion may have a thermal conductivity greater than a thermal conductivity of the mid-portion.

Yet another connector apparatus in accordance with at least one embodiment is disclosed. The connector apparatus may comprise means for electrically and mechanically mating a first plurality of electrical contacts to a mating connector, and means for thermoelectrically dissipating thermal energy.

A method for dissipating thermal energy in a connector system in accordance with at least one embodiment is disclosed. The method may comprise plugging a first connector having a first plurality of electrical contacts into a first receptacle connector, plugging a second connector having a second plurality of electrical contacts into a second receptacle connector, and conveying electrical signals through a plurality of electrical signal conductors coupled between the first plurality of electrical contacts and the second plurality of electrical contacts. The plurality of electrical signal conductors may be enclosed within a cable jacket extending between the first connector and the second connector. The method may further comprise conductively dissipating a greater amount of thermal energy through a first end portion of the cable jacket having a first thermal conductivity than through a mid-portion of the cable jacket having a second thermal conductivity less than the first thermal conductivity, wherein the first end portion extends between the first connector and the mid-portion.

Another method for dissipating thermal energy in a connector system in accordance with at least one embodiment is disclosed. The method may comprise mating a first connector of the connector system having a first plurality of electrical contacts to a second connector of the connector system having a second plurality of electrical contacts. The method may further comprise thermoelectrically dissipating thermal energy from at least one of the first connector and the second connector.

BRIEF DESCRIPTION OF THE DRAWINGS

Various aspects of apparatus and methods will now be presented in the detailed description by way of example, and not by way of limitation, with reference to the accompanying drawings, wherein.

DETAILED DESCRIPTION

Figure 1:
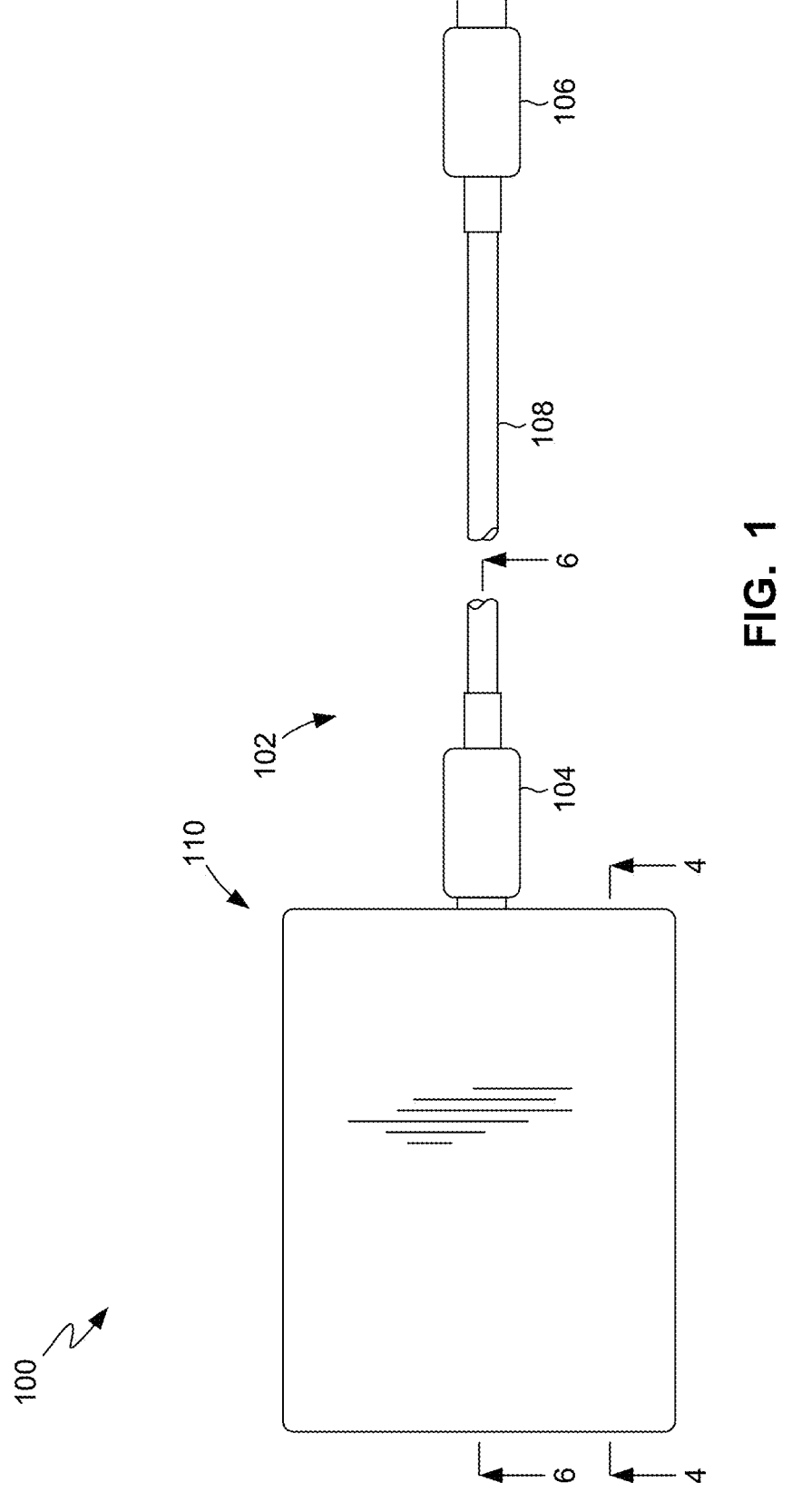
FIG. 1 is a plan view of a connector apparatus, in accordance with certain aspects of the disclosure.

The detailed description set forth below in connection with the appended drawings is intended as a description of various configurations and is not intended to represent the only configurations in which the concepts described herein may be practiced. The detailed description includes specific details for providing a thorough understanding of various concepts. However, it will be apparent to those skilled in the art that these concepts may be practiced without these specific details. In some instances, well known structures and components are shown in block diagram form to avoid obscuring such concepts.

As used herein, the term "coupled to" in the various tenses of the verb "couple" may mean that element A is directly connected to element B or that other elements may be connected between elements A and B (i.e., that element A is indirectly connected with element B), to operate certain intended functions. In the case of electrical components, the term "coupled to" may also be used herein to mean that a wire, trace, or other electrically conductive material is used to electrically connect elements A and B (and any components electrically connected therebetween). In some examples, the term "coupled to" may mean a transfer of electrical energy between elements A and B, to operate certain intended functions.

In some examples, the term "electrically connected" may mean having an electric current or configurable to having an electric current flowing between the elements A and B. For example, the elements A and B may be connected via resistors, transistors, or an inductor, in addition to a wire, trace, or other electrically conductive material and components. Furthermore, for radio frequency functions, the elements A and B may be "electrically connected" via a capacitor.

In some examples, the term "thermally coupled" may mean that the elements are configured with respect to one another to allow a transfer of thermal energy between them. An element A may be thermally coupled (e.g., by conduction) directly to an element B that the element A is in contact with, or indirectly through one or more other (e.g., thermally conductive) elements in contact with the elements A and B.

The terms "first," "second," "third," etc. may be employed for ease of reference and may not carry substantive meanings. Likewise, names for components/modules may be adopted for ease of reference and might not limit the components/modules. Modules and components presented in the disclosure may be implemented in hardware, software, or a combination of hardware and software. The terms "software" and "firmware" are used synonymously in this disclosure.

Thermal mitigation features may be included in one or more portions of a Universal Serial Bus (USB) cable assembly, in a USB receptacle portion of a device, or in other USB-related structures. In accordance with one aspect of the present disclosure, one or both ends of a USB cable jacket may have greater thermal conductivity than the portion between them. The portion having the greater thermal conductivity may dissipate excess heat from the cable into the environment. In accordance with another aspect of the present disclosure, a USB cable connector or the USB receptacle portion of a device may include one or more thermoelectric heat pumps. The thermoelectric heat pump may move excess heat from the cable assembly or receptacle into a portion of the cable assembly or device that dissipates the heat into the environment.

As illustrated in FIG. 1, in an exemplary embodiment a connector system 100 may include a cable assembly 102. The cable assembly 102 may include a first connector 104 and a second connector 106 coupled by a cable 108 extending between the first and second connectors 104 and 106. Each of the first and second connectors 104 and 106 may have a configuration in conformance with a standard specification, such as, for example, USB Power Delivery (USB-PD). In this exemplary embodiment, the first and second connectors 104 and 106 may be USB plugs that are mateable with USB receptacles. As described in further detail below, the connector system 100 may further include a connector-related portion of a portable computing device (PCD) 110. The PCD 110 may be, for example, a cellular telephone, tablet computer, palmtop computer, portable digital assistant (PDA), portable game console, etc. Although in this exemplary embodiment the first connector 104 is user-attachable to and user-removable from the PCD 110, it should be understood that in other embodiments an electronic device may have a connector in accordance with the present disclosure that is captively retained. For example, some power adapters are known that have captively retained connectors.

Figure 2A:
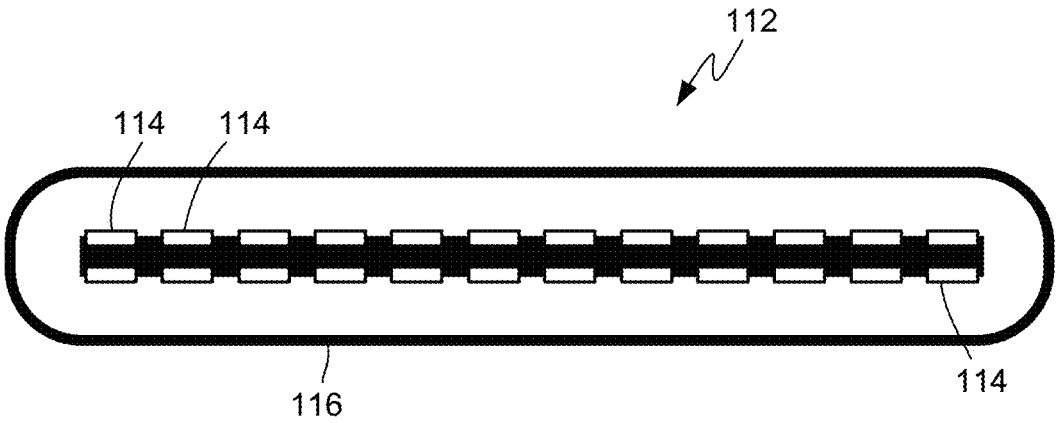
FIG. 2A is an end elevation view of a USB-PD receptacle connector, in accordance with certain aspects of the disclosure.
Figure 2B:
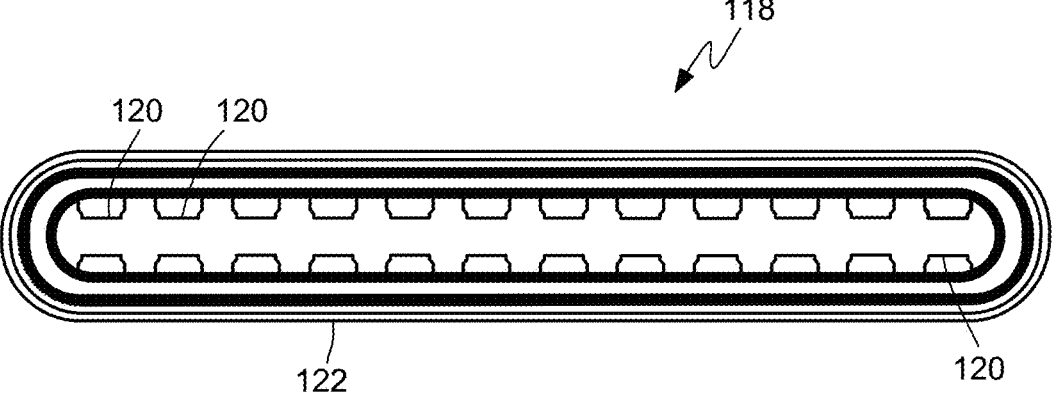
FIG. 2B is an end elevation view of a USB-PD plug connector, in accordance with certain aspects of the disclosure.

As illustrated in FIG. 2A, a USB-PD receptacle configuration 112 may be characterized by an array of electrical contacts 114 mounted within a receptacle housing 116. Some of the electrical contacts 114 are configured to carry power, and others of the electrical contacts 114 are configured to carry data signals. Similarly, as illustrated in FIG. 2B, a USB-PD plug configuration 118 may be characterized by an array of electrical contacts 120 mounted within a plug housing 122. Some of the electrical contacts 120 are configured to carry power, and others of the electrical contacts 120 are configured to carry data signals. Each of the first and second connectors 104 and 106 (FIG. 1) may have the USB-PD plug configuration 118.

Figure 3:
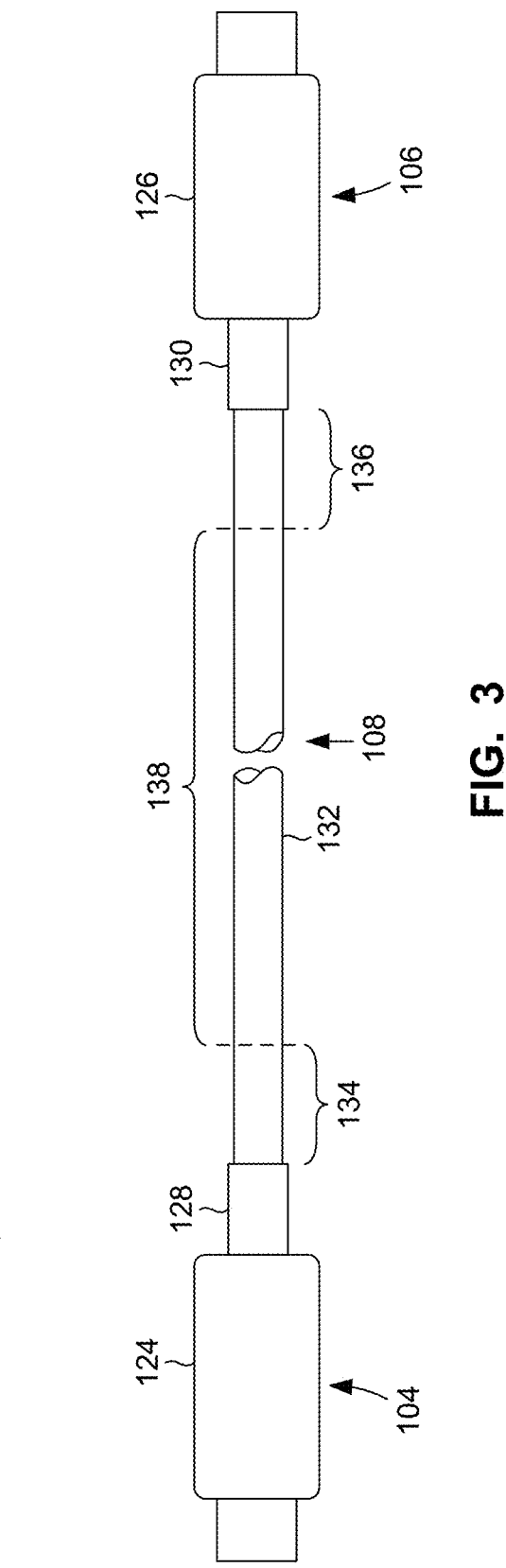
FIG. 3 is plan view of another connector apparatus, in accordance with certain aspects of the disclosure.

As illustrated in FIG. 3, the first and second connectors 104 and 106 may comprise overmolds 124 and 126, respectively. In addition to the first and second connectors 104 and 104 and the cable 108, the cable assembly 102 may include strain relief boots 128 and 130, attached to the first and second connectors 104 and 106, respectively. Nevertheless, other embodiments (not shown) may omit such strain relief boots.

Cable 108 includes a cable jacket 132 extending between the first and second connectors 104 and 106. Although not shown for purposes of clarity, the cable jacket 132 encloses electrical conductors (e.g., copper wires) that couple the electrical contacts 120 of the connector 104 with the electrical contacts 120 of the connector 106. In the embodiment illustrated in FIG. 3, the cable jacket 132 consists of exactly three sections or portions: a first end portion 134 adjacent the connector 104; a second end portion 136 adjacent the connector 106; and a mid-portion 138 extending between the first and second end portions 134 and 136. The cable 108 may be made of flexible materials to enable the cable 108 to be gathered, wound, etc., in the manner of a conventional USB cable.

The term "cable jacket" as used in this disclosure means the generally tubular structure made of a flexible, electrically insulating or dielectric material that forms an exterior portion of the cable 108. The strain relief boots 128 and 130 are not part of the cable jacket 132 or the connectors 104 and 106. The end portions 134 and 136 and mid-portion 138 may all have the same diameter, appearance, texture, and other superficial characteristics. Nevertheless, in other embodiments the end portions 134 and 136 may differ in such respects from the mid-portion 138. The first and second end portions 134 and 136 refer to portions of the cable jacket 132 that are exposed to the environment (e.g., air) and do not include any portions of the cable jacket 132 that may be within the strain relief boots 128 and 130 or within connectors 104 and 106.

The first and second end portions 134 and 136 are configured to dissipate excess thermal energy from the connectors 104 and 106, respectively, while the mid-portion 138 may be more similar in such thermal properties to a conventional USB cable. The first and second end portions 134 and 136 may be made of a dielectric (i.e., electrically insulating) material having a higher thermal conductivity than the material of which the mid-portion 138 is made. An example of a material of which the first and second end portions 134 and 136 may be made is a low-density polyethylene (LDPE) based composite filled with hybrid boron nitride (BN) particles, thereby providing a higher thermal conductivity than LDPE. Other materials having higher thermal conductivity than materials of which conventional USB cables are made are also well known. An example of a material of which the mid-portions 138 may be made is LDPE. For purposes of the present disclosure, a measurement of heat dissipation may serve as a proxy for thermal conductivity. For example, when the cable 108 is being used to charge a device or supply power to a device, measured temperatures on the surfaces of the first and second end portions 134 and 136 may be at least 20 percent greater than a measured temperature on the surface of the mid portion 138. More generally, if while a connector apparatus is conducting an electrical current it is determined that a measured temperature of a portion of the connector apparatus is at least 20 percent higher than a measured temperature of another portion of the connector apparatus, then for purposes of the present disclosure the portion has a higher thermal conductivity than the other portion.

In an example, the length of each of the first and second end portions 134 and 136 may be between about 2.5 cm and 5.0 cm. Further, or alternatively, the length of each of the first and second end portions 134 and 136 may be between about 0.025 and 0.050 the length of the mid-portion 138. Thus, in an example in which the total length of the cable jacket 132 is one meter, the length of each of the first and second end portions 134 and 136 may be in a range between about 2.5 cm and 5.0 cm, and the length of the mid-portion 138 is accordingly between about 85.0 cm and 90.0 cm. Nevertheless, other examples of the cable 108 may have any length.

Although in the above-described exemplary embodiment the cable jacket 132 consists of exactly three portions, in other embodiments (not shown) such a heat-dissipating cable jacket may consist of only two portions: an end portion and the remainder of the cable jacket, where the end portion may be made of a material having a higher thermal conductivity than the material of which the remainder of the cable jacket is made.

Figure 4:
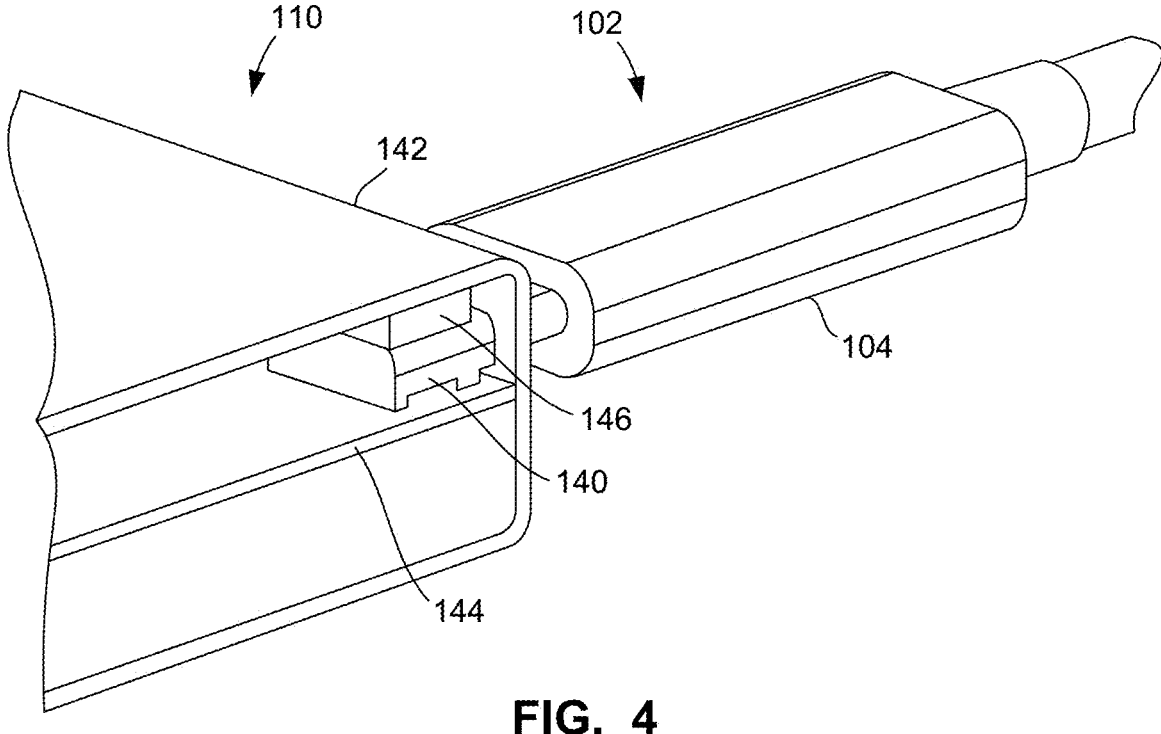
FIG. 4 is a perspective view of a portion of the connector apparatus of FIG. 1, cut away or sectioned on line 4-4 of FIG. 1 to show the device housing interior, in accordance with certain aspects of the disclosure.

As illustrated in FIG. 4, in another exemplary embodiment the device 110 includes a connector apparatus comprising a connector 140 mounted in a housing 142 of the device 110. The connector 140 may have the above-described USB receptacle configuration 112 (FIG. 2A). The connector 140 may be mounted on a printed circuit board 144 in the housing 142, with the plug-receiving (receptacle) portion of the connector 140 extending through an opening in a wall of the housing 142. A thermoelectric heat pump 146 may be located in the housing 142. For example, the thermoelectric heat pump 146 may be mounted in contact with both the connector 140 and the interior surface of the housing 142. This mounting configuration may enable the thermoelectric heat pump 146, when activated, to transfer heat from the connector 140 to the housing 142 through conductive thermal coupling between the thermoelectric heat pump 146 and the connector 140 and between the thermoelectric heat pump 146 and the housing 142. The housing 142 may serve as a heat sink to dissipate the heat to the air outside the housing. The thermoelectric heat pump 146 uses the so-called Peltier effect to provide cooling, i.e., heat transfer, effect in response to a current that it provides through a junction of two materials. As such thermoelectric heat pumps are commercially available and well understood by one of ordinary skill in the art, details of its structure and operation are not provided in this disclosure for brevity. Nevertheless, a brief description of a method 500 for controlling the thermoelectric heat pump 146 is described below with regard to FIG. 5.

Figure 5:
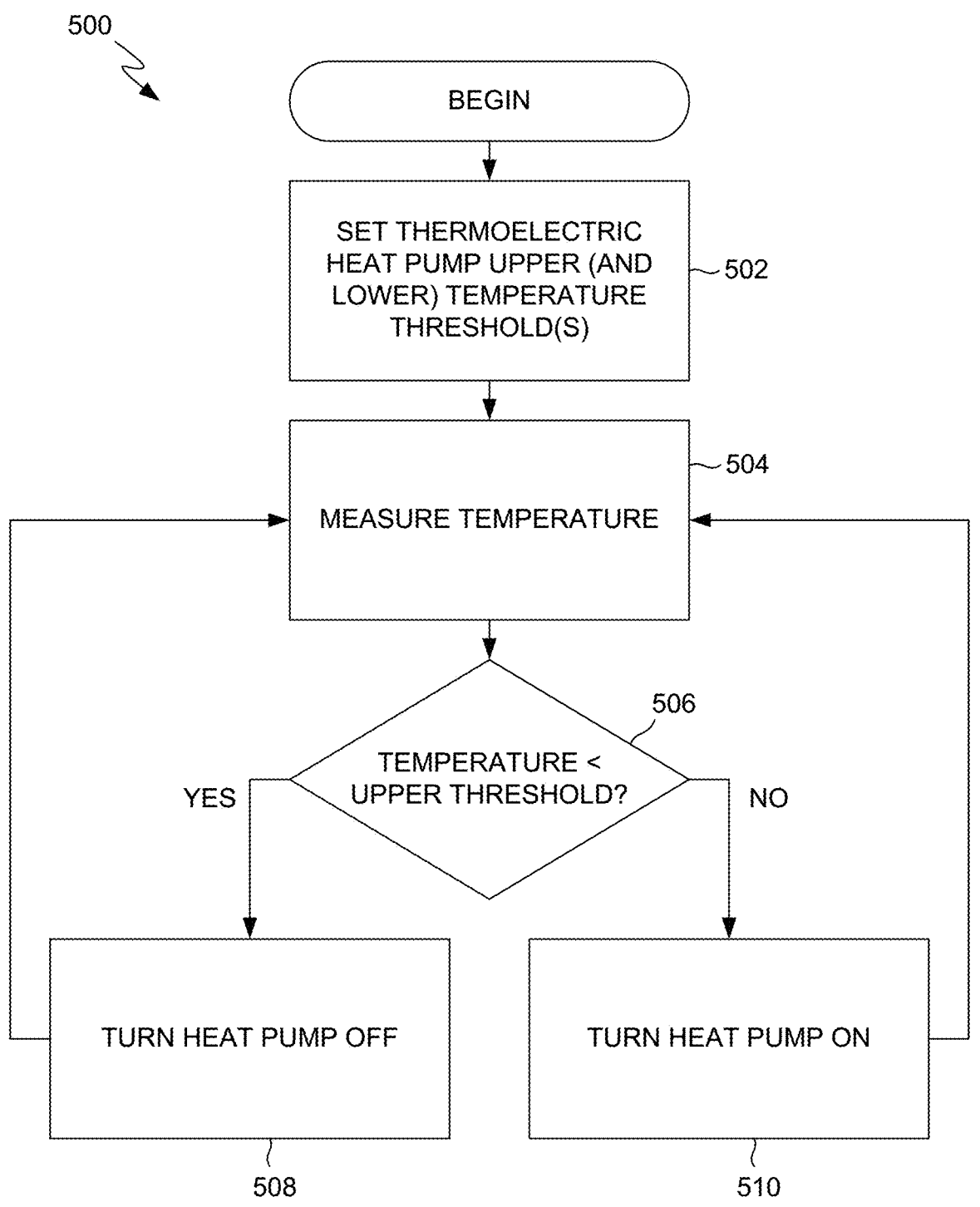
FIG. 5 is a flow diagram, illustrating a method for controlling thermal energy dissipation from a connector system using a thermoelectric heat pump, in accordance with certain aspects of the disclosure.

As illustrated in FIG. 5, the method 500 may include setting at least an upper temperature threshold, as indicated by block 502. A temperature measurement may be obtained from a sensor (not shown in FIGS. 4-5) on or near the connector 140, as indicated by block 504. The temperature measurement may be compared with the upper temperature threshold, as indicated by block 506. If it is determined (block 506) that the temperature measurement is less than the upper temperature threshold, the thermoelectric heat pump 146 may be turned off, i.e., deactivated, as indicated by block 508. When turned off, the thermoelectric heat pump 146 does not provide the above-described heat transfer effect. If it is determined (block 506) that the temperature measurement is greater than or equal to the upper temperature threshold, the thermoelectric heat pump 146 may be turned on, i.e., activated, as indicated by block 510. Following blocks 508 and 510, the method 500 may return to block 506 in an iterative or looping manner, to provide continuous control of the thermoelectric heat pump 146.

When turned on, the thermoelectric heat pump 146 provides the above-described heat transfer effect. After the thermoelectric heat pump 146 is turned on, temperature measurements may decrease as a result of the removal of heat from the connector 140. Although not shown in FIG. 5, such a method may include hysteresis. In embodiments that include hysteresis, both an upper and lower temperature threshold would be set as described above with regard to block 502, and the temperature measurement would be compared with both the upper and lower temperature thresholds. Based on the comparison with the upper and lower temperature thresholds, the thermoelectric heat pump 146 may be controlled in a manner that tends to maintain the temperature measurements within a window between the upper and lower temperature thresholds. The thermoelectric heat pump 146 may include a temperature sensor and controller circuitry configured in the foregoing manner, or a temperature sensor and controller circuitry may be included externally to the thermoelectric heat pump 146. For example, the thermoelectric heat pump 146 may be controlled by control elements of the device 110 that provide thermal mitigation to other portions (not shown) of the device 110.

Figure 6:
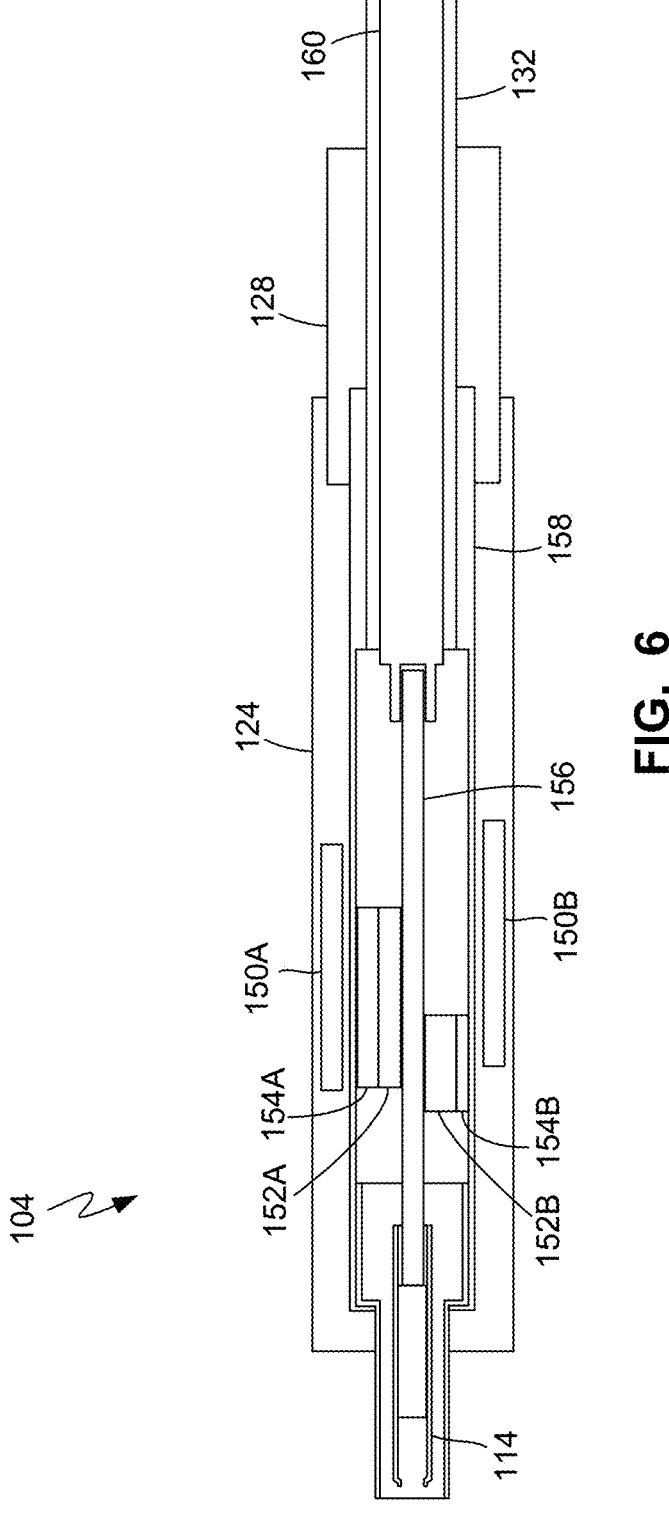
FIG. 6 is a sectional view, taken on line 6-6 of FIG. 1.

As illustrated in FIG. 6, in another exemplary embodiment the connector 104 or other such connector may include thermoelectric heat pumps 150A and 150B, each in contact with or otherwise located in proximity to active electronic devices 152A and 152B, respectively. The term "active" in this context refers to an electronic device that consumes power to perform an electronic function. Although in the illustrated embodiment there are two thermoelectric heat pumps 150A and 150B and two corresponding active electronic devices 152A and 152B, in other embodiments there may be any number of one or more thermoelectric heat pumps. In such other embodiments there may be as few as zero active electronic devices. Thermal interface material 154A and 154B may be included between active electronic devices 152A and 152B and thermoelectric heat pumps 150A and 150B, respectively, to enhance thermal coupling. The active electronic devices 152A and 152B may be mounted on a printed circuit board 156 within a metal inner housing 158. The thermoelectric heat pumps 150A and 150B may be located between an exterior portion of the metal inner housing 158 and an interior portion of the overmold 124 that covers the metal inner housing 158. The copper conductors 160 that are coupled to the printed circuit board 156 extend rearward from the connector 104 through the boot 128. The thermoelectric heat pumps 150A and 150B may include temperature sensors and controller circuitry configured in the manner described above with regard to FIG. 5. Except for the thermoelectric heat pumps 150A and 150B, the connector 104 (FIG. 6) may have a conventional structure and may conform to a USB standard, such as USB-PD. The connector 104 may have the above-described USB plug configuration 118 (FIG. 2B).

Figure 7:
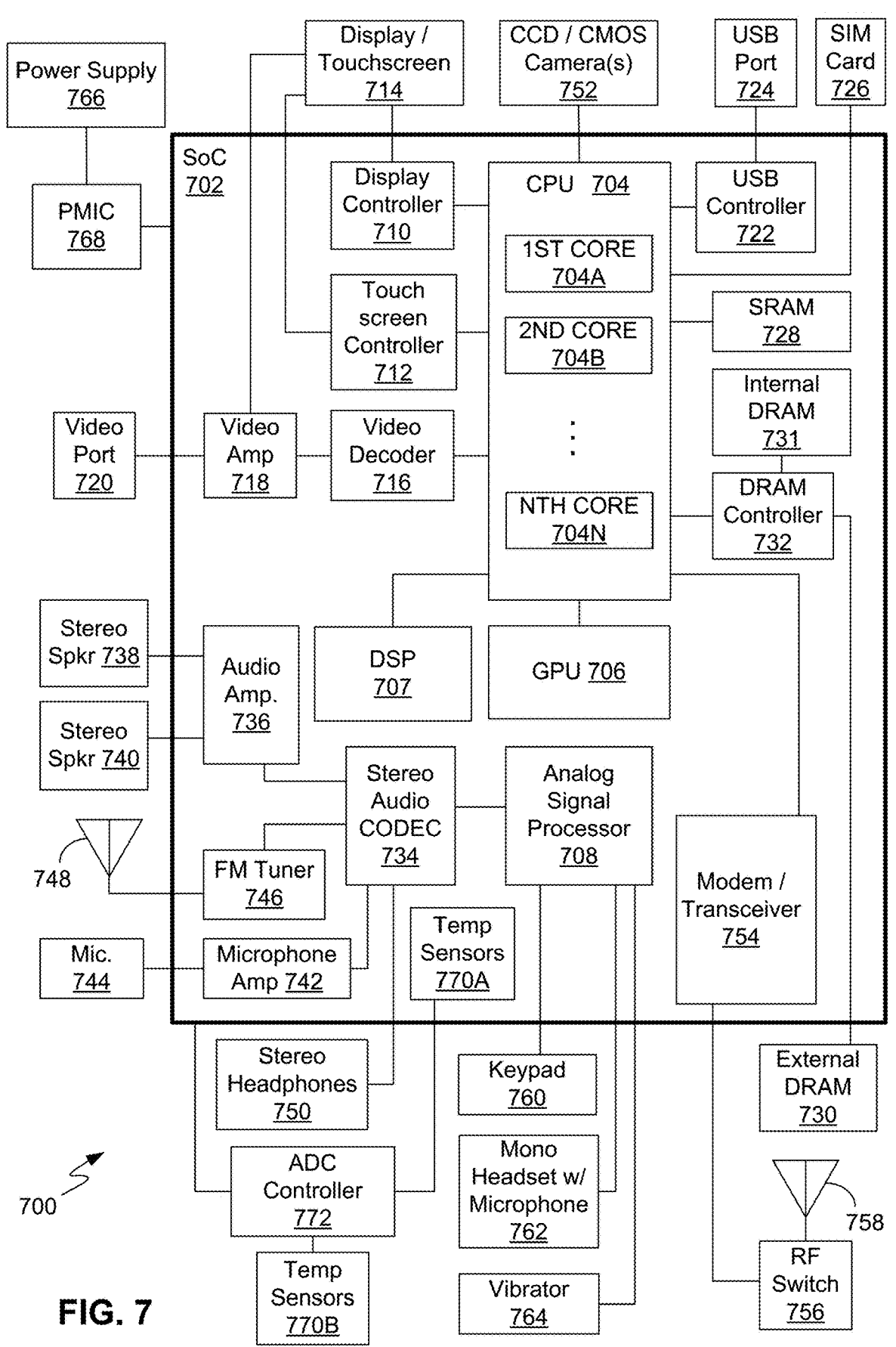
FIG. 7 is a block diagram of a portable computing device, in accordance with certain aspects of the disclosure.

As illustrated in FIG. 7, a PCD 700 may be an example of the PCD 110 described above with regard to FIG. 1. The PCD 700 includes a system-on-chip (SoC) 702. The SoC 702 may include a central processing unit (CPU) 704, a graphical processing unit (GPU) 706, a digital signal processor (DSP) 707, an analog signal processor 708, or other processors. The CPU 704 may include multiple cores, such as a first core 704A, a second core 704B, etc., through an Nth core 704N.

A display controller 710 and a touchscreen controller 712 may be coupled to the CPU 704. A touchscreen display 714 external to the SoC 702 may be coupled to the display controller 710 and the touchscreen controller 712. The PCD 700 may further include a video decoder 716 coupled to the CPU 704. A video amplifier 718 may be coupled to the video decoder 716 and the touchscreen display 714. A video port 720 may be coupled to the video amplifier 718. A subscriber identity module ("SIM") card 726 may be coupled to the CPU 704. A USB controller 722 may also be coupled to CPU 704, and a USB port 724 may be coupled to the USB controller 722. The USB port 724 may have the receptacle configuration 112 described above with regard to FIG. 2A.

One or more memories may be coupled to the CPU 704. The one or more memories may include both volatile and non-volatile memories. Examples of volatile memories include static random access memory (SRAM) 728 and dynamic RAMs (DRAMs) 730 and 731. Such memories may be external to the SoC 702, such as the DRAM 730, or internal to the SoC 702, such as the DRAM 731. A DRAM controller 732 coupled to the CPU 704 may control the writing of data to, and reading of data from, the DRAMs 730 and 731. In other embodiments, such a DRAM controller may be included within a processor, such as the CPU 704.

A stereo audio CODEC 734 may be coupled to the analog signal processor 708. Further, an audio amplifier 736 may be coupled to the stereo audio CODEC 734. First and second stereo speakers 738 and 740, respectively, may be coupled to the audio amplifier 736. In addition, a microphone amplifier 742 may be coupled to the stereo audio CODEC 734, and a microphone 744 may be coupled to the microphone amplifier 742. A frequency modulation ("FM") radio tuner 746 may be coupled to the stereo audio CODEC 734. An FM antenna 748 may be coupled to the FM radio tuner 746. Further, stereo headphones 750 may be coupled to the stereo audio CODEC 734. Other devices that may be coupled to the CPU 704 include one or more digital (e.g., CCD or CMOS) cameras 752.

A modem or RF transceiver 754 may be coupled to the analog signal processor 708. An RF switch 756 may be coupled to the RF transceiver 754 and an RF antenna 758. In addition, a keypad 760, a mono headset with a microphone 762, and a vibrator device 764 may be coupled to the analog signal processor 708.

A power supply 766 may be coupled to the SoC 702 via a power management integrated circuit (PMIC) 768. The power supply 766 may include a rechargeable battery or a DC power supply that is derived from an AC-to-DC transformer connected to an AC power source.

The SoC 702 may have one or more internal or on-chip thermal sensors 770A and may be coupled to one or more external or off-chip thermal sensors 770B. An analog-to-digital converter (ADC) controller 772 may convert voltage drops produced by the thermal sensors 770A and 770B to digital signals. One of the external thermal sensors 770B may be provided in contact with or otherwise in proximity to the USB port 724 receptacle structure in the manner described above with regard to FIG. 4.

The touch screen display 714, the video port 720, the USB port 724, the camera 752, the first stereo speaker 738, the second stereo speaker 740, the microphone 744, the FM antenna 748, the stereo headphones 750, the RF switch 756, the RF antenna 758, the keypad 760, the mono headset 762, the vibrator 764, the thermal sensors 750B, the ADC controller 752, the PMIC 768, the power supply 766, the DRAM 730, and the SIM card 726 are external to the SoC 702 in this exemplary embodiment. It will be understood, however, that in other embodiments one or more of these devices may be included in such an SoC.

The CPU 704 (or a core thereof), GPU 706, or DSP 707, operating with a PCD memory, such as the DRAM 730 or 731, or the SRAM 728, and associated components may be an example of a processor system in which the above-described method 500 (FIG. 5) may be controlled or achieved through the execution of firmware or software. Any such PCD memory or other memory or storage medium having the firmware or software or a portion thereof stored thereon in computer-readable form may be an example of a "computer program product," "computer-readable medium," etc., as such terms are understood in the patent lexicon.

The foregoing description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, and are to be accorded the full scope consistent with the language of the claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

The words "module," "mechanism," "element," "device," and the like may not be a substitute for the word "means." As such, no claim element is to be construed as a means plus function unless the element is expressly recited using the phrase "means for."

What is claimed is:

1. A connector apparatus, comprising:
a connector having a Universal Serial Bus-Power Delivery (USB-PD) configuration which has a first set of electrical contacts for supporting communication signals and a second set of contacts for supporting power delivery;
a plug overmold that encloses the first and second contacts of the connector, the overmold further encloses a printed circuit board and an active electronic device positioned on the printed circuit board which generates heat, the plug overmold further encloses a strain relief boot and a metal housing, the strain relief boot encloses a cable jacket which surrounds a cable; the cable being coupled to the printed circuit board; and
a thermoelectric heat pump device positioned within the plug overmold and adjacent to the metal housing for transferring heat from the active electronic device to the plug overmold; a thermal interface material being positioned between the active electronic device and the metal housing; the metal housing being positioned within the strain relief boot and within the plug overmold; a first end of the metal housing enclosing a portion of the cable jacket; the metal housing fully enclosing the printed circuit board, the active electronic device, and the electrical contacts; a second end opposite to the first end of the metal housing encloses the electrical contacts and extends outside of the overmold.

2. The connector apparatus of claim 1, wherein the cable comprises a copper conductor.

3. The connector apparatus of claim 2, wherein the printed circuit board is coupled to connector.

4. The connector apparatus of claim 1, wherein the thermoelectric heat pump device is a first thermoelectric heat pump device, the connector apparatus further comprising a second thermoelectric heat pump device positioned within the plug overmold and adjacent to the metal housing.

5. The connector apparatus of claim 1, further comprising:
a temperature sensor; and
a temperature controller coupled to the temperature sensor and configured to activate the thermoelectric heat pump device in response to a sensed temperature greater than a threshold.

* * * * *